Sept. 4, 1956
R. B. DAVIS
2,761,305
INJECTING AND TAMPING TOOL
Filed July 29, 1952
2 Sheets-Sheet 1
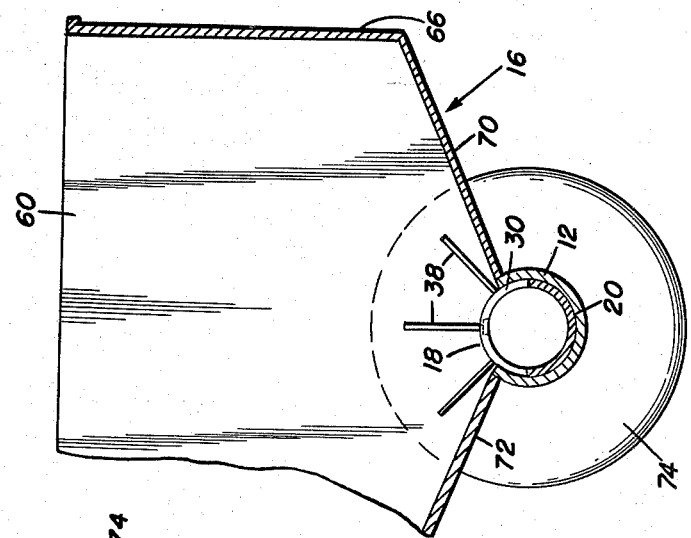
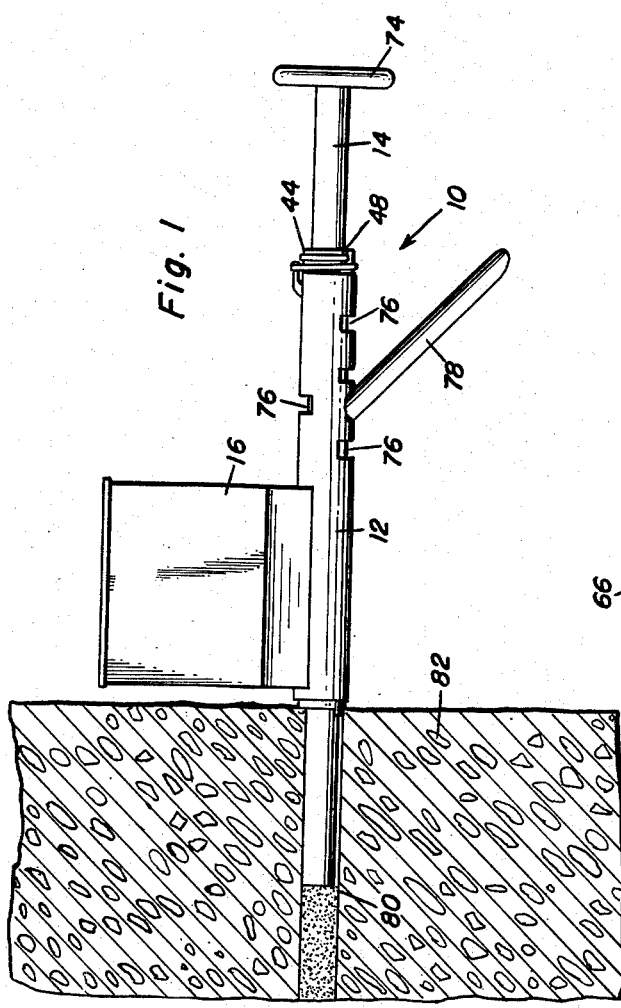
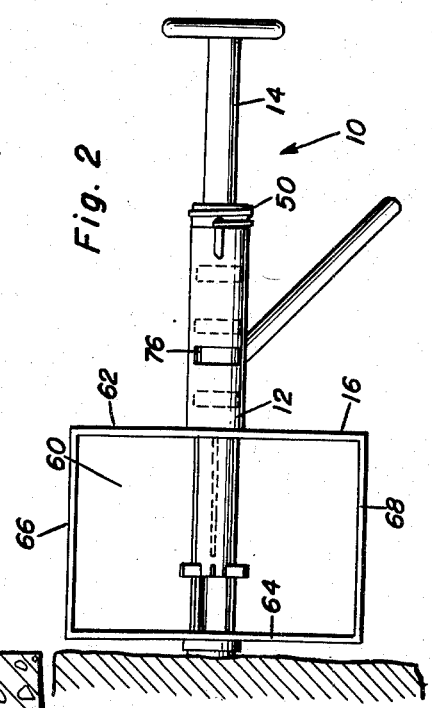
Robert B. Davis
INVENTOR.
BY *Clarence A. O'Brien
and Harvey B. Jackson*
Attorneys

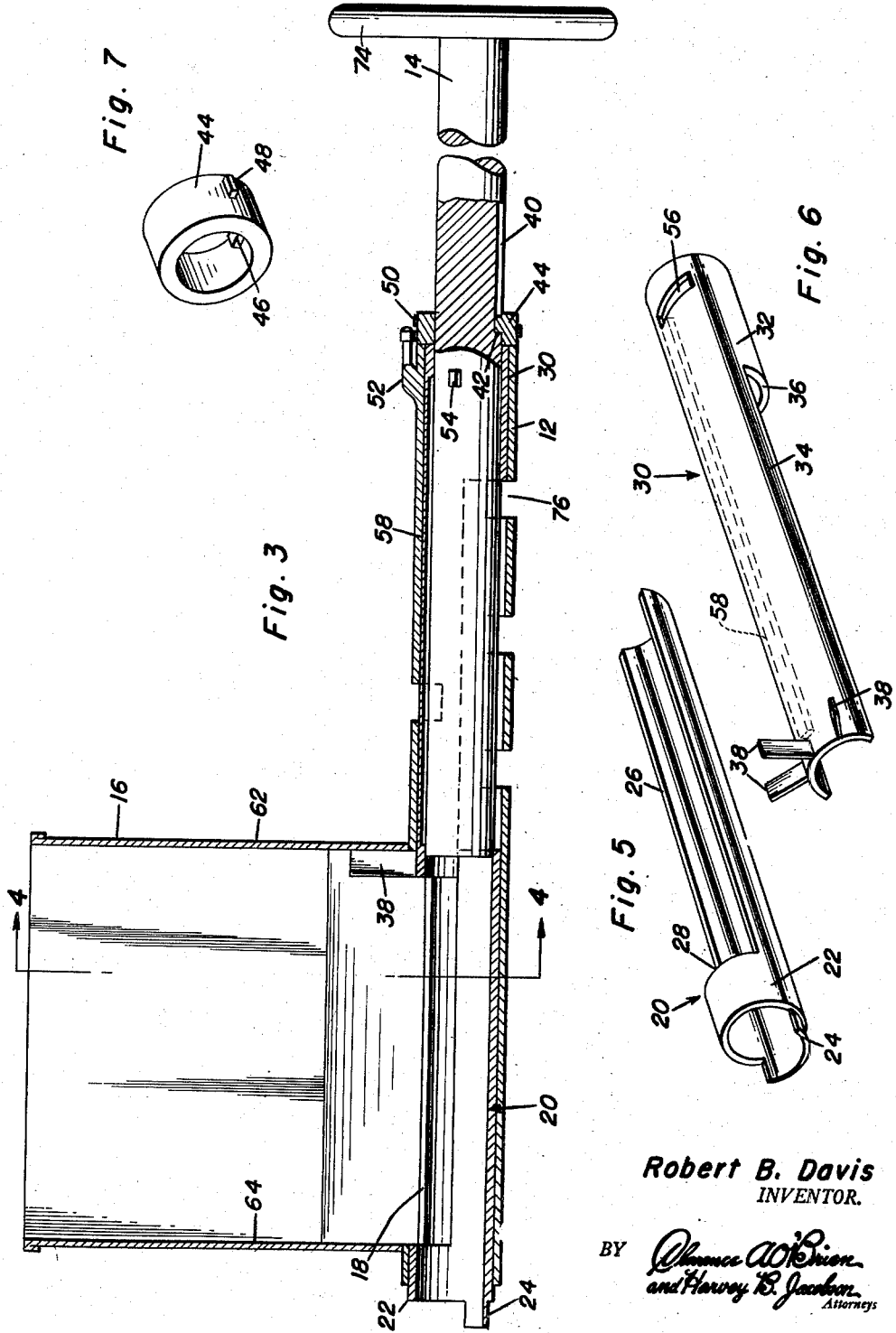

United States Patent Office 2,761,305
Patented Sept. 4, 1956

2,761,305

INJECTING AND TAMPING TOOL

Robert B. Davis, Richmond, Calif.

Application July 29, 1952, Serial No. 301,579

5 Claims. (Cl. 72—128)

The present invention relates to tamping tools and more particularly relates to a combination injection and tamping tool for filling openings in concrete, brick, stone or other masonry and allied materials where injection or compaction by tamping is necessary.

The primary object of the invention is to provide an injection and tamping tool that will simultaneously inject material into the opening or fissure to be sealed or repaired and compact the material by tamping.

Another object of the present invention is to provide an injection and tamping tool that will allow the injection and compaction to any desired density, which may be used alternatively to perform either an injection operation or a tamping operation or both, and which will extract the amount of material needed from the tool at the desire of the operator.

Yet another object of the invention is to provide a tamping tool that will permit uniform compaction, which is durable, simple to repair, and which is extremely efficient in use.

These, together with various ancillary features and objects, which will later become apparent as the following description proceeds, are attained by the present invention, a preferred embodiment of which is shown by example only in the accompanying drawings, wherein:

Figure 1 is a side elevational view of the injection and tamping tool with the tamping rod of the tool being disposed in an opening;

Figure 2 is a front elevational view of the injection and tamping tool similar to Figure 1 showing the hopper opening;

Figure 3 is a side view of the injection and tamping tool, taken partly in section to show the details of construction of the tool, with the tamping rod being shown in inoperative position;

Figure 4 is a top sectional view of a portion of the tamping and injecting tool taken substantially along section line 4—4 of Figure 3;

Figure 5 is a perspective view of the guide sleeve of the injection and tamping tool;

Figure 6 is a perspective view of the agitating sleeve of the injecting and tamping tool; and, Figure 7 is a perspective view of the clamping ring which forms a part of the injection and tamping tool.

Referring now to the accompanying drawings in detail wherein like numerals are utilized to designate like parts throughout the various views, the numeral 10 designates the injecting and tamping tool in its entirety. The tool 10 comprises generally a cylindrical, tubular casing 12, a tamping rod 14 slidable within the casing 12, and a material hopper or receptacle 16 which is fixedly secured to the casing 12.

Referring now to Figures 3-7, the construction of the injection and tamping tool 10 will become readily apparent. The outer end of the casing 12 is provided with a vertically elongated slot 18 and the hopper 16 is secured to the casing so that the discharge end thereof opens into the slot 18. This provides access to the interior of the casing through the hopper 16 for dispensing material from the hopper into the casing. Concentrically disposed within the casing and fixed to the lower portion of the inner portion thereof is a guide sleeve 20 which comprises a lower barrel-shaped portion 22 having an outwardly extending supporting lip 24 for supporting the tool on a surface preparatory to operating the same. The inner portion of the guide sleeve 20 is in the form of a trough or channel, semi-circular in cross-section, indicated by the numeral 26. At the juncture of the troughed or channeled portion 26 and the barrel portion 22 is formed an abutment shoulder 28.

Also disposed within the casing 12 is a sleeve 30 which is of a construction complementary to the guide sleeve 20 comprising a barrel-shaped inner end portion 32 and a semi-circular trough or channel-shaped outer end portion 34 with an abutment shoulder 36 being formed at the junction of these two end portions. The sleeve 30, is, however, slidably disposed within the casing 12 with its outer channeled end portion 34 sliding upon the inner channeled portion 26 of the guide sleeve 20. When the sleeve 30 is slid outwardly in the casing, the outer end of this sleeve abuts the abutment shoulder 28 formed in the guide sleeve, which is fixed to the casing 12, while the abutment shoulder 36 of the sleeve 30 abuts the inner end of the guide sleeve 20. Thus, these sleeves 20 and 30 provide the two halves of a tubular sleeve and form the means for guiding the tamping rod 14 in its sliding movement within the casing 12.

At the outer end of the sleeve 30, a plurality of radially extending agitating fins 38 are provided, which fins extend through the longitudinal slot 18 in the casing 12 and into the container or hopper 16 for mixing or spading material within the hopper and facilitating the passage of the material through the discharge end of the hopper and slot 18.

At the inner end of the tamping rod 14 and extending longitudinally along the tamping rod is a keyway 40 which terminates in an internal shoulder 42 adjacent the inner end of the casing 12 when the tamping rod 14 is in its retracted position.

Surrounding the tamping rod 14 is a clamping ring 44 having a radially projecting key 46 extending from its inner surface engaged in the keyway 40 of the tamping rod 14. Projecting radially from the outer surface of the ring 44 is a lug 48 to which one end of a coil spring 50 is attached (note Figures 1 and 2 particularly). An offset arm 52 is secured to the outer surface of the casing 12 adjacent the inner end thereof and the other end of the coil spring 50 is secured to this arm to interconnect the casing 12 and the tamping rod 14.

With this arrangement, as will be readily seen, the tamping rod is permitted to slide inwardly and outwardly to retract and extend the same within the casing and the guide sleeve formed by sleeve 30 and the guide sleeve 20 while yet permitting limited rotational movement of the tamping rod within the casing 12.

In this connection, it is to be noted that, with reference to Figure 3, the coil spring 50 is arranged in such a manner that as the tamping rod 14 is retracted, the tendency is for the tamping rod 14 to twist in a counterclockwise direction while when the tamping rod is extended through the casing 12, the tendency is to twist the tamping rod in a clockwise direction. Therefore, the clamping ring and its associated coil spring 50 serve the multiple functions of holding the sleeve against retracting movement out of the casing 12, resiliently securing the tamping rod 14 to the casing 12, and finally imparting reverse twists to the tamping rod as the same is retracted into or extended through the casing 12.

Immediately below and circumferentially spaced from the shoulder 42 of the keyway 40 a knob or projection 54 extends from the tamping rod 14. A beveled slot 56 is formed in the upper barrel-shaped end 32 of the sleeve 30 and when the tamping rod 14 is retracted within the casing 12, the knob 54 is disposed in the upper portion of the beveled slot or groove 56 in the sleeve 30. The sleeve 30 is further provided with an elongated, undercut key or guideway 58 which communicates at its upper end with the lower end of the beveled slot 56 and as the tamping rod 14 is extended through the casing 12, the action of the spring 50 will twist the tamping rod clockwise so that the projection or lug 54 will ride along the beveled slot 56 into the guideway 58.

Referring now to Figures 1, 2 and 4, the construction of the hopper and its attachment to the casing 12 will be clearly observed. As shown in these figures, the hopper 16 comprises a substantially rectangular box having an open top 60, end walls 62 and 64 and side walls 66 and 68. At their lower ends, the side walls 66 and 68 are angulated as at 70 and 72 to form a hopper bottom and are secured to the casing 12 adajacent the slot 18. Guide sleeve 20, as shown particularly in Figures 3 and 4, is secured to the inner surface of the casing 12 in such a manner that the troughed portion 26 of this sleeve is disposed opposite the slot 18 in the casing. Sleeve 30, on the other hand, is disposed so that the troughed portion of this member will ride over and close the slot 18 of the casing 12 as the sleeve 30 is slid longitudinally outwardly within the casing.

A hand-grip in the form of a disk or wheel 74 is secured to the inner end of the tamping rod 14 for slidably actuating the same within the casing 12 whereas the casing 12 is provided with a plurality of longitudinally spaced openings in the form of transverse slot 76 for allowing excess material to escape from the casing as the tamping rod 14 is extended therethrough. Also secured to the casing 12 is an angularly inclined supporting handle 78 for steadying the injection and tamping tool when the same is to be operated.

The operation of the tool is as follows. Referring first to Figure 3, the projection 54 of the tamping rod 14 is disposed within the beveled slot 56 of the sleeve 30. As the tamping rod 14 is extended through the casing 12, the sleeve 30 will be likewise slid through the casing so that the fins 38 secured to the end of this sleeve will ride between the end walls 62 and 64, respectively, of the hopper 16 to facilitate the movement of material from the hopper 16 into the casing 12. When the fins 38 reach the end wall 64 of the hopper or when the end of the sleeve 30 is in contact with the abutment shoulder 28 of the guide sleeve 20 and the abutment shoulder 36 of the sleeve 30 is in contact with the inner end of the guide sleeve 20, the action of the spring 50 causes the lug 54 to ride along the beveled slot 56 and through the guideway 58 in the sleeve 30 so that the tamping rod may continue through the casing 12 and perform its tamping action as shown in Figure 1, wherein the rod is shown as being extended into an opening 80 in a concrete wall 82. When the tamping rod 14 is to be extracted from the hole or opening 80 of the wall 82, the projection 54 first rides inwardly along the undercut groove or guideway 58 of the sleeve 30 and then due to the twisting action of the spring 50 is then twisted into the beveled slot 56, at which point the sleeve 30 will retract with the tamping rod 14 until it abuts the end wall 62 of the hopper or until the key 46 of the clamping ring 44 abuts the shoulder 42. Excess material which may be caught within the sleeve 12 is allowed to escape through the openings 76 formed in the casing.

Upon extending movement of the tamping rod 14 toward the outer end 22 of the casing, the key 54 in the slot 56 will simultaneously move the sleeve 30 with the rod 14 and urge the fins 38 lengthwise of the hopper to spade the material therein. When the fins 38 reach their outermost limit and engage the opposite outer wall 64 of the hopper, the tamping rod 14 will be twisted so that the key 54 will engage in the undercut groove or keyway 58 in the sleeve 30, as will be noted in Figures 3 and 6, so that the rod will slide freely with no relative sliding movement of the sleeve from this point until the tamping rod is extended through the outer end of the sleeve. Thus, it is seen that the sleeve 30 is not coupled with the rod 14 for its entire movement but is only coupled to the rod 14 for a portion of the movement of said rod.

Further, when the tamping rod 14 is retracted back through the inner end of the casing, the key 54 first slides up the keyway 58 in the sleeve 30 so that no movement of the sleeve occurs at this point since the disposition of the fins within the hopper at the outer end of the hopper engaging the material in the hopper prevents such movement. However, when the key 54 hits the inner end of the keyway 58 which opens into the slot 56 of the sleeve 30, the sleeve will be pulled inwardly to its position shown in Figure 3 by further movement of the tamping rod 14 away from the outer end of the casing.

Obviously, by this arrangement, the operator of the tool can dispense any desired quantity of material from the hopper 16 for injection into a fissure or opening or he may forego any injection whatsoever and utilize only the tamping rod 14 without any injection of material.

The above description is believed to clearly set forth the construction and operation of the tamping tool. However, since numerous modifications and changes will readily occur to one skilled in the art after a consideration of the foregoing specification and the accompanying drawings, it is not desired to limit the invention to the exact construction shown and described; but, all suitable modifications and changes may be resorted to falling within the scope of the appended claims.

Having thus described the invention, what is claimed as new is:

1. A tamping tool comprising a tubular casing having an elongated material receiving slot therein, a pair of complementary sections disposed within said casing, one of said sections being fixedly secured within said casing and the other of said sections being slidable within said casing, a tamping and injecting rod slidable within said casing, means interconnecting said casing and said tamping rod for resisting relative rotational movement therebetween, and means interengaging said tamping rod and said other section, said interengaging means comprising a radial projection on said tamping rod, said other section having an inclined slot and an elongated undercut groove opening into said slot, said projection riding in said slot and moving said other section together with said tamping rod for a portion of the movement of said tamping rod to move said other section into closing position relative to said material receiving slot, said other section in its closing position engaging an end of the material receiving slot to stop movement of said other sleeve section, after which said projection enters and rides in said undercut groove and said tamping rod moves outwardly of said casing to eject material from said casing and tamp the material.

2. A tamping tool comprising a tubular casing having an elongated material receiving slot therein, a pair of complementary sections disposed within said casing, one of said sections being fixedly secured within said casing and the other of said sections being slidable within said casing, a tamping and injecting rod slidable within said casing, means interconnecting said casing and said tamping rod for resisting relative rotational movement therebetween, and means interengaging said tamping rod and said other section, said tamping rod having a longitudinally extending keyway, said interconnecting means including a ring surrounding said tamping rod, a key on said ring engaged in said keyway, and a resilient element secured at its ends to said casing and said ring, said interengaging means comprising a radial projection on said tamping rod, said other section having an inclined slot and an elongated undercut groove opening into said slot, said projection riding in said inclined slot and moving said other section together with said tamping rod for a portion of the movement of said tamping rod to move said other section into closing position relative to said material receiving slot, said other section in its closed position engaging an end of the material receiving slot to stop movement of said other section, after which said projection enters and rides in said undercut groove and said tamping rod moves outwardly of said casing to eject material from the casing and tamp the material, said resilient element tending to twist said projection into said inclined slot as the tamping rod is rotated in one direction and into said undercut groove as the tamping rod is moved inwardly in an opposite direction.

3. A tamping tool comprising a tubular casing having open inner and outer ends, said casing having an elongated material receiving slot in the wall thereof, a hopper on said casing having a dispensing opening in registry with said slot for depositing materials in the casing through said slot, a rod slidable in said casing to eject materials from the outer end of the casing, a sleeve slidable in said casing to close said slot, means coupling said sleeve to said rod for simultaneous sliding together with said rod during a portion of the sliding movement of the rod, said sleeve having at least one fin thereon projecting into said hopper for spading material, within the hopper during the sliding of the sleeve with the rod, said sleeve engaging an end of said slot to stop sliding thereof when the slot is closed, said sleeve having an angularly inclined slot adjacent one end and an elongated longitudinal keyway opening into one end of said slot, said tamping rod having a key thereon normally seating in said inclined slot for sliding the sleeve with the tamping rod, said key being movable out of the angularly inclined slot into said keyway for independent sliding of said tamping rod with respect to said sleeve to eject material from the outer end of the casing and tamp the material after sliding of the sleeve has stopped.

4. A tamping tool comprising a tubular casing having open inner and outer ends, said casing having an elongated material receiving slot in the wall thereof, a hopper on said casing having a dispensing opening in registry with said slot for depositing materials in the casing through said slot, a rod slidable in said casing to eject materials from the outer end of the casing, a sleeve sliding in the casing to close said slot, means coupling said sleeve to said rod for sliding together with said rod during a portion of the sliding movement of the rod, said sleeve having at least one fin thereon projecting into said hopper for spading material, within the hopper during sliding of the sleeve with the rod, said sleeve engaging an end of said slot to stop sliding thereof when the slot is closed, said sleeve having an angularly inclined slot adjacent one end and an elongated, longitudinal keyway opening into one end of said slot, said tamping rod having a key thereon normally seating in said inclined slot for sliding the sleeve with the tamping rod, said key being movable out of the angularly inclined slot into said keyway for independent movement of said tamping rod with respect to said sleeve to eject material from the outer end of the casing and tamp the material after sliding of the sleeve has stopped, means interengaging said tamping rod and said casing for relative rotational movement therebetween for rotating said tamping rod key into and out of engagement with said angularly inclined slot in response to movement of the tamping rod.

5. A tamping tool comprising a tubular casing having open inner and outer ends, said casing having an elongated material receiving slot in the wall thereof, a hopper on said casing having a dispensing opening in registry with said slot for depositing materials in the casing through said slot, a rod slidable in said casing to eject materials from the outer end of the casing, a sleeve slidable in the casing to close said slot, means coupling said sleeve to said rod for sliding together with said rod during a portion of the sliding movement of the rod, said sleeve having at least one fin thereon projecting into said hopper for spading material, within the hopper during the sliding of the sleeve with the rod, said sleeve engaging an end of said slot to stop sliding thereof when the slot is closed, said sleeve having an angularly inclined slot adjacent one end and an elongated longitudinal keyway opening into one end of said slots, said tamping rod having a key thereon normally seating in said inclined slot for sliding the sleeve with the rod upon movement of the tamping rod, said key being movable out of the angularly inclined slot into said keyway for independent movement of said tamping rod with respect to said sleeve to eject material from the outer end of the casing and tamp the material after sliding of the sleeve has stopped, said interengaging means including a collar rotatably mounted on the inner end of said casing, resilient means interconnecting said collar and said casing for resisting relative rotation therebetween, said tamping rod being slidably keyed to said collar.

References Cited in the file of this patent

UNITED STATES PATENTS 2,622,434     Rutka                Dec. 23, 1952